HIGH VOLTAGE PULSE GENERATOR

Filed March 25, 1958

INVENTORS
ALBERT J. MORRIS
JOSEPH P. SWANSON
BY Lippincott, Smith & Ralls
ATTORNEYS United States Patent Office 2,871,380

Patented Jan. 27, 1959

2,871,380

HIGH VOLTAGE PULSE GENERATOR

Albert J. Morris, Redwood City, and Joseph P. Swanson, Menlo Park, Calif., assignors to Levinthal Electronic Products, Inc., Palo Alto, Calif., a corporation of California Application March 25, 1958, Serial No. 723,811

3 Claims. (Cl. 307—106)

This invention relates to electric pulse generators for producing high-voltage rectangular-waveform pulses.

Briefly stated, in accordance with certain aspects of this invention, rectangular-waveform voltage pulses are produced by the well-known method of alternately charging and discharging a capacitance. Although this general principle is old, certain difficulties have heretofore existed in using it to generate high-voltage pulses having faster rise and fall times, substantially flat pulse tops, precisely controlled and preferably adjustable pulse durations, and at high duty cycles. Circuits heretofore proposed for use in such cases have tended to be fairly complex, large and expensive, or have failed to meet the stated requirements. The present invention provides improved and simplified high-voltage, rectangular-waveform pulse generator circuits.

The new pulse generator circuits include two pulse transformers each having a primary and a secondary. A D. C. high-voltage supply is connected between certain terminals of the two secondaries, and other terminals of the two secondaries are connected through rectifiers to a pulse output terminal. A low-voltage repetition rate trigger generator and an adjustable delay circuit supply triggering pulses in adjustably timed sequence to two pulse generators, which supply current pulses to the two primaries sequentially. Responsive to voltage pulses of opposite polarity thus induced in the two secondaries, the rectifiers conduct current alternately, alternately charge and discharge the shunt capacitance associated with the output terminal, and produce high-voltage rectangular-waveform output pulses. Other rectifiers may be connected across the two secondaries to limit overshoots and to establish accurately the amplitude of the output pulses.

By this simple means, difficult problems heretofore existing in the art are solved. For example (and by no means a limitation) repetitive pulses of 30,000 volts amplitude or more, having rise and fall times in the order of 0.25 microsecond, pulse tops flat within approximately two percent of the pulse amplitude per microsecond of pulse width, and pulse durations continuously adjustable over a wide range (e. g., 5 to 40 microseconds), can be produced at duty cycles approaching 100 percent. Such pulse generators are particularly useful as modulators for gridded high-power pulsed klystrons, travelling-wave tubes, and the like.

The foregoing and other aspects of this invention may be better understood from the following illustrative description and accompanying drawings. The scope of the invention is defined by the appended claims.

Figure 1:
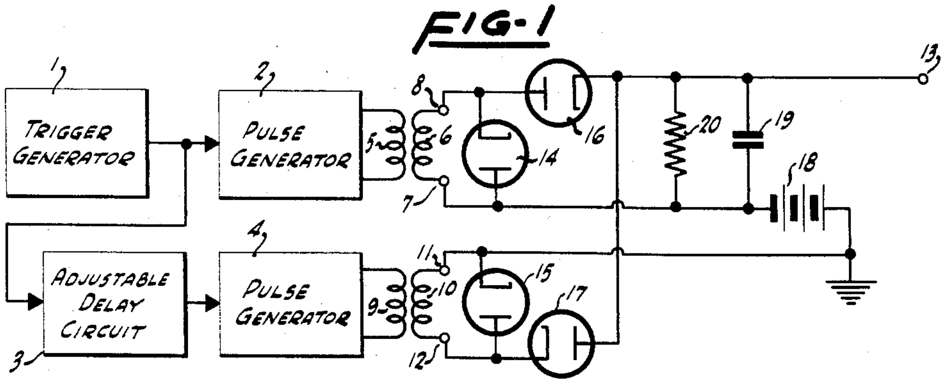
Fig. 1 is a schematic circuit diagram of a high-voltage, rectangular-waveform pulse generator.

An example of a pulse generator incorporating certain principles of this invention is illustrated in Fig. 1. A repetition rate trigger generator 1 may be any device capable of producing repetitive, low-voltage, trigger pulses. Numerous forms of such low-voltage pulse generators are well known to those skilled in the art. The trigger generator supplies repetitive, low-voltage, electric pulses to a pulse generator 2 and an adjustable delay circuit 3. Such circuits are well known and require no description. For example, the adjustable delay circuit may consist essentially of a monostable multivibrator provided with means for adjusting the time constant of its internal coupling circuit, in a well known manner. One example of a suitable pulse generator is a standard hard-tube pulser, which may comprise a high-vacuum triode connected in series with a capacitor and a pulse transformer primary, whereby a trigger pulse applied to the triode grid causes the capacitor to discharge suddenly through the transformer primary. At an adjustably fixed time interval following each trigger pulse supplied by trigger generator 1, adjustable delay circuit 3 supplies a delayed trigger pulse to a second pulse generator 4. Thus, the two pulse generators 2 and 4 are triggered into operation alternately in adjustably timed sequence.

A first pulse transformer has a primary 5 and a secondary 6. Each operating cycle of pulse generator 2, initiated by a trigger pulse received from trigger generator 1, provides a pulse of current through primary 5. Two terminals 7 and 8 are at respective ends of secondary 6. Terminal 7 is maintained at a constant electric potential by means hereinafter described, and therefore it is herein referred to as a constant-potential terminal. Each current pulse through primary 5 induces a positive-going potential change at terminal 8. Therefore, terminal 8 is herein called a variable-potential terminal. The pulse transformer and pulse generator may be designed, using conventional design principles well known to those skilled in the art, to produce at terminal 8 positive-going voltage pulses having an amplitude in excess of 30,000 volts. In other words, the pulse generator and pulse transformer generate voltage pulses of the desired large amplitude, but not of the waveform and other characteristics desired of the output pulses.

A second pulse transformer has a primary 9 and a secondary 10. Each operating cycle of pulse generator 4, initiated by a delayed trigger pulse from adjustable delay circuit 3, supplies a pulse of current through primary 9. Two terminals 11 and 12 are located at opposite ends of secondary 10. Terminal 11 is maintained at a constant electric potential by means hereinafter described, and is herein called a constant-potential terminal. Each pulse of current through primary 9 induces a negative-going change in the potential of terminal 12. Accordingly, terminal 12 is herein called a variable-potential terminal. The pulse transformer and pulse generator may be designed, using conventional design principles well known to those skilled in the art, to produce at terminal 12 negative-going potential pulses having amplitudes in excess of 30,000 volts. The negative-going pulses at terminal 12 follow the positive-going pulses at terminal 8 in adjustably fixed time sequence, with the time interval between successive positive and negative pulses controlled by adjustable delay circuit 3.

A pulse output terminal is identified by reference number 13. Four half-wave rectifiers 14, 15, 16 and 17 are connected as shown. Rectifier 14 is connected across secondary 6. It has an anode connected to terminal 7 and a cathode connected to terminal 8, so that rectifier 14 is non-conductive when terminal 8 is positive with respect to terminal 7, but become conductive to prevent terminal 8 from becoming substantially negative with respect to terminal 7. Rectifier 15 is connected across secondary 10. It has an anode connected to terminal 12 and a cathode connected to terminal 11, so that rectifier 15 is nonconductive when terminal 12 is negative with respect to terminal 11, but conducts current to prevent terminal 12 from becoming substantially positive with respect to terminal 11.

Rectifier 16 has an anode connected to terminal 8 and a cathode connected to terminal 13, so that current can flow through rectifier 16 from terminal 8 to terminal 13, but not in the reverse direction. Rectifier 17 has an anode connected to terminal 13 and a cathode connected to terminal 12, so that current can flow through rectifier 17 from terminal 13 to terminal 12, but not in the reverse direction.

Each of the four rectifiers may be a vacuum diode, or a solid state rectifier, and is capable of withstanding a reverse voltage at least as large as the output pulse amplitude—e. g., at least 30,000 volts.

A 30,000 volt D. C. voltage supply 18 is connected between the two constant-potential terminals 7 and 11, as shown, with the polarity of the voltage supply such that terminal 7 is maintained 30,000 volts negative with respect to terminal 11. In the embodiment illustrated in Fig. 1, terminal 11 is connected to circuit ground and thereby is maintained at ground potential. Consequently, terminal 7 is maintained at a constant potential of —30,000 volts. It should be understood that "circuit ground" is merely a reference point in the circuit—in effect, an A. C. ground with respect to the pulses under consideration—which is not necessarily at zero absolute potential. For example, if the output pulses at terminal 13 are to be used for pulsing a gridded klystron, "circuit ground" for the circuits herein described may be the cathode of the klystron, which may be at any desired potential relative to the earth.

A capacitor 19, connected between output terminal 13 and constant-potential terminal 7, as shown, provides a shunt capacitance that opposes potential changes of terminal 13. Capacitor 19 may be a physical circuit element, or may simply represent inherent circuit capacitance including the capacitance of any load circuit that may be connected to output terminal 13. A resistor 20 is connected in parallel with capacitor 19. Resistor 20 may be a physical circuit element, or may simply represent the inherent and unavoidable leakage resistance of the circuit. In general, the use of a physical circuit element having a high resistance, several megohms for example, is preferable for reasons of safety (to discharge capacitance 19 when the circuit is turned off) and circuit stability.

The capacitance of capacitor 19 and the resistance of resistor 20 should be made sufficiently large to give a resistance-capacitance time constant that is long compared to the maximum duration of an output pulse. This time constant may advantageously be in the order of one hundred times the maximum pulse duration. For example, to produce flat-topped pulses with durations up to 50 microseconds, resistor 20, in parallel with the inherent circuit leakage resistance, may have a resistance of 1 megohm, and capacitor 19, in parallel with the inherent circuit capacitance, may have a capacitance of 0.005 microfarad. Because of this long time constant, the amount that capacitor 19 discharges through resistor 20 during an output pulse of less than 50 microsecond duration is negligible for practical purposes, and sag of the pulse tops due to this cause is quite small.

While theoretically there is no upper limit on the length of this time constant, it is undesirable to make the capacitance of capacitor 19 too large because, for given pulse rise and fall times, the power that must be supplied by each of the pulse generators 2 and 4, for alternately charging and discharging the shunt capacitance as hereinafter explained, is approximately proportional to the value of the shunt capacitance. Thus, if the total shunt capacitance, including capacitor 19, the inherent circuit capacitance and the shunt capacitance of any output circuit connected to the terminal 13, is excessive, either excessively large amounts of power must be supplied by the two pulse generators, or the pulse rise and fall times will be lengthened undesirably, thus degrading the output pulse waveform.

If no trigger pulses were supplied by trigger pulse generator 1 for a considerable period, capacitor 19 would discharge through resistor 20 and pulse output terminal 13 would assume the potential (e. g., —30,000 volts) provided by D. C. voltage supply 18. Under such conditions, there is no appreciable voltage across rectifiers 14, 15, and 16, and there is a reverse voltage of 30,000 volts across rectifier 17. Consequently, all of the four rectifiers are nonconductive.

Now assume that trigger generator 1 supplies a trigger pulse to pulse generator 2 and adjustable delay circuit 3. Pulse generator 2 is immediately triggered into operation by the trigger pulse and supplies a current pulse through primary 5. This current pulse induces a large positive-going change in the potential of terminal 8, and charging current flows into capacitor 19 through rectifier 16. Consequently, there is a rapid positive-going change in the voltage across capacitor 19, and thus in the potential at output terminal 13. The rate of this change is directly proportional to the magnitude of the charging current and inversely proportional to the capacitance of capacitor 19. Therefore, to produce a rapid rate of change, and a corresponding short pulse rise time, the magnitude of the charging current should be large relative to the valve of the shunt capacitance.

Since the magnitude of the charging current depends upon the magnitude of the output power supplied to the pulse transformer by the pulse generator 2, the pulse rise time can be made very short by the use of a pulse generator designed to provide a high instantaneous output power for short time intervals. This is simply a matter of conventional pulse generator design, using design principles that are well known to those skilled in the art. In the embodiment illustrated, the amplitude of the output pulses is limited but not necessarily equal to the D. C. voltage provided by supply 18, or 30,000 volts, as is hereinafter more fully explained. Consequently, the pulse generator and pulse transformer may be so designed that the positive-going change in potential at terminal 8 could have an amplitude considerably larger than 30,000 volts if it were not limited in the manner hereinafter described.

As a result, capacitor 19 is quickly charged (e. g., to 30,000 volts or less, depending on pulse generator output), within a time interval in the order of one microsecond. In a circuit so designed, it is significant that the time required to charge capacitor 19, and therefore the rise time of the output pulse, is critically dependent upon the pulse transformer characteristics, but the pulse duration and flat-top characteristics are not. Therefore the limitations inherent in the design of pulse transformers do not correspondingly limit the useful part of the output pulses. This is a very important advantage of the circuit illustrated over certain prior circuits intended for the generation of high-voltage rectangular-waveform pulses. Another advantage is that the requirements imposed on the pulse transformer now become trivial because it only has to pass a pulse for the duration of the required rise time or fall time of the output pulse and the pulse transformer does not have to carry currency during the flat top of the main pulse period.

If capacitor 19 has been charged to the full 30,000 volts, in the manner just explained, output terminal 13, and the circuit elements directly connected thereto, are at essentially circuit ground potential. However, pulse generator 2 may still be supplying power to the pulse transformer, and consequently the potential of terminal 8 tends to continue rising. If this were permitted, charging current would continue to flow into capacitor 19, and the potential of output terminal 13 would go positive relative to ground. This is prevented by rectifiers 15 and 17.

As soon as terminal 13 becomes the slightest amount positive with respect to circuit ground, rectifiers 15 and 17 become conductive, and further current flow through rectifier 16 is diverted through rectifiers 15 and 17. Therefore, the charging of capacitor 19 is clamped very closely to the voltage of the D.-C. supply 18. The continued flow of current through rectifiers 16, 17, and 15, during such time as pulse generator 2 continues to deliver power to the first pulse transformer, serves as a clamp that holds the potential of output terminal 13 substantially at circuit ground potential.

On the other hand, if blocking oscillator 2 stops delivering output power before the output pulse is terminated in the manner hereinafter described, the rectifiers become nonconductive as soon as the potential of terminal 13 drops a slight amount below circuit ground potential, and the charge remaining on capacitor 19 is trapped there. Any further discharge of capacitor 19 must proceed through the high resistance of resistor 20 at a slow rate established by the relatively long resistant-capacitance time constant. Accordingly, the pulse top sags at a slow rate, which is negligible for practical purposes in circuits designed according to the principles herein disclosed. Thus, the flatness of the pulse tops and the pulse durations are substantially independent of the pulse generator and pulse transformer characteristics, and in particular are freed from the limitations inherent in pulse transformer design.

Trigger pulse generator 1 supplies trigger pulses to pulse generator 2 and adjustable delay circuit 3 simultaneously. Following each trigger pulse and after a time interval that depends solely upon the design or adjustment of the conventional delay circuit 3, delay circuit 3 supplies a delayed trigger pulse to pulse generator 4, which thereupon supplies to primary 9 of the second pulse transformer a pulse of current that induces a negative-going change in the potential of variable-potential terminal 12. As terminal 12 becomes more negative, current flows through rectifier 17 and rapidly discharges capacitor 19.

Even if pulse generator 2 is still supplying some power to the circuit, so that some current continues to flow through rectifier 16, capacitor 19 will discharge at a rate proportional to the difference between the current conducted by rectifiers 17 and 16. In general, the peak power output of pulse generator 2 will have been passed by this time, so that a rapid discharge of capacitor 19, and a correspondingly short pulse fall time, can be accomplished without making the peak output of pulse generator 4 larger than the peak output of pulse generator 2. In any event, capacitor 19 can be discharged rapidly at any time by designing pulse generator 4 for an appropriately large output. Where short fall times, in the order of one microsecond or less, are desired, pulse generator 4 and the second pulse transformer are designed, using conventional, well known design principles, to provide at terminal 12 a negative-going potential change that would considerably exceed 30,000 volts if it were not limited by the means hereinafter described.

As soon as the potential of output terminal 13 falls slightly below −30,000 volts, rectifiers 14 and 16 become conductive and any appreciable further negative-going change in the potential of terminal 13 is prevented. Accordingly, the output pulse is terminated quickly and sharply, without appreciable negative overshoot.

It is noteworthy that the circuit described above incorporates positive, powerful means both for charging and for discharging capacitor 19, so that high-voltage rectangular-waveform pulses having exceptionally short rise and fall times are readily generated. The pulse amplitude may be less than or equal to the D.-C. voltage of voltage supply 18, and is limited to this voltage by positive clamping means. In addition, clamping means are provided to prevent appreciable overshoot at the leading and trailing edges of the output pulses. The output pulse duration is precisely controlled by delay circuit 3, and can be adjusted over a considerable range (for example, from 5 or less to 40 or more microseconds) by well-known conventional adjustment means associated with the relatively low-voltage delay circuit. Moreover, since A.-C. coupling only is required for transmitting the trigger pulses to pulse generators 2 and 4, the trigger generator 1 and delay circuit 3 may be operated at low potential levels relative to earth, whereby pulse length and repetition rate adjustments can be made with ease and safety, while other parts of the circuit are floating at high voltage (e. g., −125 kv. D.-C. in an actual embodiment for pulsing a gridded klystron). The duration of the output pulses is substantially independent of critical limitations inherent in the design of pulse generators 2 and 4 and the two pulse transformers.

Furthermore, another output pulse can be started (by supplying another trigger pulse to pulse generator 2 and adjustable delay circuit 3 from trigger pulse generator 1) very shortly after the termination of a preceding output pulse, even though pulse generator 4 may still be supplying some power to the second pulse transformer, since pulse generator 2 can be designed to deliver more charging current through rectifier 16 than is withdrawn through rectifier 17 shortly after pulse generator 4 has passed its peak output. Therefore, high duty cycles, approaching 100 percent, are attainable.

In applications where the requirements regarding fall times and negative overshoots are not so severe, as is often the case, rectifier 14 may be omitted and pulse generator 4 made somewhat less powerful. Less frequently, the requirements with respect to rise times and positive overshoots are not so severe, in which case rectifier 15 may be omitted and pulse generator 2 made somewhat less powerful. To meet the most stringent requirements, both of the rectifiers 14 and 15 should be used, and both of the pulse generators should be made sufficiently powerful to overdrive the charging and discharging circuits, as hereinbefore explained.

For short-duration output pulses, pulse generator 2 may continue to deliver power to the capacitor-charging circuit throughout the pulse duration, so that the pulse amplitude is effectively clamped at its peak value and appreciable sag of the pulse top is prevented, even when low-impedance load circuits are connected to terminal 13 for receiving the output pulses.

In the case of pulses of longer duration (in the order of 40 microseconds, for example), it is generally desirable for reasons of economy to provide a pulse generator 2 that does not provide a high instantaneous power output for such long time interval. In this case, the flatness of the pulse top depends upon a long resistance-capacitance time constant, which in turn demands a relatively high resistance for resistor 20, including the parallel resistance due to leakage paths and the resistive component of the load impedance. Therefore, in such cases the output circuit immediately connected to output terminal 13 should have a high input resistance. If the output pulses must be supplied to a low-impedance load, the requirements are easily met by inserting a conventional cathode follower between output terminal 13 and the ultimate load impedance.

The circuit illustrated in Fig. 1 provides output pulses of up to 30,000 volts amplitude superimposed on a base potential of −30,000 volts. In other words, the potential of output terminal 13 varies from −30,000 volts between pulses up to approximately 0 volts at the pulse tops, all relative to "circuit ground," which may or may not be at earth potential. This circuit is especially suitable for use as a modulator with high-power, gridded, pulsed klystrons, and traveling-wave tubes, so operated that the tube is cut off when its control grid is at a high negative potential, such as −30,000 volts relative to cathode potential, and operates to provide high-power bursts of radio-frequency energy when its control grid is raised to cathode potential. In this case, circuit ground of the Fig. 1 circuit is connected to the klystron or traveling-wave tube cathode, and terminal 13 is connected to the klystron or traveling-wave tube grid.

Figure 2:
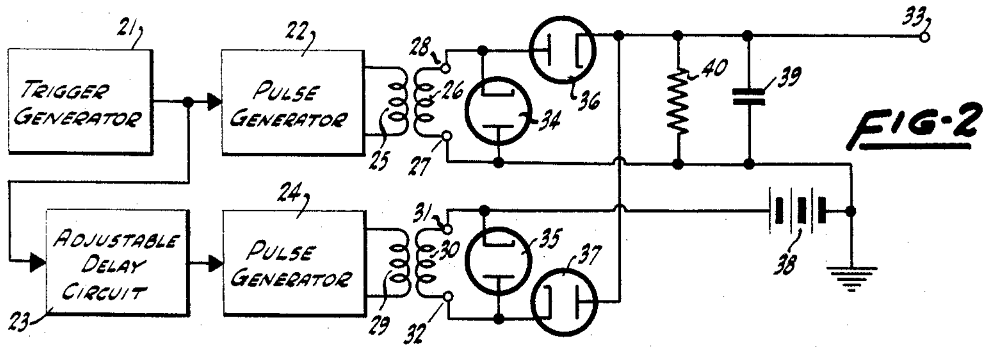
Fig. 2 is a schematic circuit diagram of another high-voltage, rectangular-waveform pulse generator.

Another example of a pulse generator incorporating certain principles of this invention is illustrated in Fig. 2. In this pulse generator, the potential of the output terminal varies from 0 volts between pulses up to as much as +30,000 volts at the pulse tops, relative to circuit ground potential. The circuit illustrated in Fig. 2 is essentially identical to the circuit illustrated in Fig. 1, except for a relocation of the D. C. voltage supply relative to circuit ground, so that a 0 voltage base potential is provided at the output terminal.

In Fig. 2, a trigger generator 21 supplies repetitive trigger pulses to a pulse generator 22 and an adjustable delay circuit 23, simultaneously. Delay circuit 23 supplies delayed trigger pulses to a second pulse generator 24. A first pulse transformer has a primary 25 and a secondary 26. At respective ends of secondary 26 are a constant-potential terminal 27 and a variable-potential terminal 28. A second pulse transformer has a primary 29 and a secondary 30. At opposite ends of secondary 30 are a constant-potential terminal 31 and a variable-potential terminal 32. The pulse transformers are connected to the pulse generators 22 and 24 so that each operation of pulse generator 22 supplies a pulse of current through primary 25, and each operation of pulse generator 24 supplies a pulse of current through primary 29.

A pulse output terminal is identified by reference number 33. A half-wave rectifier 34 has an anode connected to constant-potential terminal 27 and a cathode connected to variable-potential terminal 28. A rectifier 35 has an anode connected to variable-potential terminal 32 and a cathode connected to constant-potential terminal 31. A half-wave rectifier 36 has an anode connected to variable-potential terminal 28 and a cathode connected to pulse output terminal 33. A half-wave rectifier 37 has an anode connected to output terminal 33 and a cathode connected to variable-potential terminal 32.

A 30,000 volt D. C. voltage supply 38 is connected between the two constant-potential terminals 27 and 31, with its polarity arranged to maintain terminal 27 at a potential of 30,000 volts negative with respect to terminal 31. In this embodiment, terminal 27 is connected to circuit ground, and is thereby maintained at circuit ground potential, while terminal 31 is maintained at a constant potential of +30,000 volts by D. C. voltage supply 38.

A capacitor 39 is connected between pulse output terminal 33 and constant-potential terminal 27, or between terminal 33 and circuit ground, which amounts to the same thing. A resistor 40 is connected in parallel with capacitor 39, as shown.

The circuit illustrated in Fig. 2 is designed and operates in exactly the same manner as the circuit illustrated in Fig. 1, except for the different location of the D. C. voltage supply relative to circuit ground. Because of this difference in the location of the D. C. voltage supply, all of the circuit potentials at and following the secondaries of the pulse transformers are shifted 30,000 volts in the positive direction. Consequently, the base potential at output terminal 33 between output pulses is equal to circuit ground potential, and the potential of pulse output potential 33 at the output pulse tops is limited to a maximum of approximately +30,000 volts.

Figure 3:
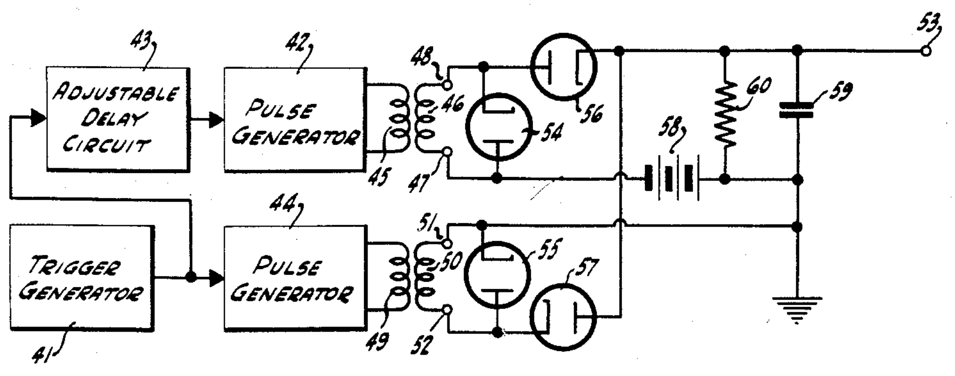
Fig. 3 is a schematic circuit diagram of still another high-voltage, rectangular-waveform pulse generator.

Still another example of a pulse generator incorporating certain principles of this invention is illustrated in Fig. 3. This embodiment provides negative-going output pulses, whereas the embodiments illustrated in Figs. 1 and 2 provide positive-going output pulses. The Fig. 3 embodiment differs from the other two illustrated embodiments in the order in which the two pulse generators are triggered, and in the location of the D. C. voltage supply.

In Fig. 3, a trigger generator 41, a pulse generator 42, an adjustable delay circuit 43, and a second pulse generator 44, respectively correspond to the generally similar parts 1, 2, 3 and 4 of Fig. 1, and 21, 22, 23 and 24 of Fig. 2, but in Fig. 3 these four parts are connected together somewhat differently, so that the upper and lower pulse generators are triggered in reverse sequence to what occurs in Figs. 1 and 2. In Fig. 3, trigger generator 41 supplies trigger pulses to pulse generator 44 and adjustable delay circuit 43 simultaneously. Delay circuit 43 supplies delayed trigger pulses to pulse generator 42, so that, responsive to each trigger pulse supplied by trigger generator 41, an operating cycle of pulse generator 44 is initiated first, and then, after a time interval controlled by delay circuit 43, an operating cycle of pulse generator 42 is initiated.

A first pulse transformer has a primary 45 and a secondary 46. Each operating cycle of pulse generator 42 supplies a pulse of current through primary 45. At respective ends of secondary 46 there are a constant-potential terminal 47 and a variable-potential terminal 48. Each pulse of current through primary 45 induces a positive-going change in the potential of terminal 48. A second pulse transformer has a primary 49 and a secondary 50. Each operating cycle of pulse generator 44 supplies a pulse of current through primary 49. At respective ends of secondary 50 there are a constant-potential terminal 51 and a variable-potential terminal 52.

A pulse output terminal is identified by reference number 53. A half-wave rectifier 54 has an anode connected to constant-potential terminal 47 and a cathode connected to variable-potential terminal 48. A half-wave rectifier 55 has an anode connected to variable-potential terminal 52 and a cathode connected to constant-potential terminal 51. A half-wave rectifier 56 has an anode connected to variable-potential terminal 48 and a cathode connected to pulse output terminal 53. A half-wave rectifier 57 has an anode connected to pulse output terminal 53 and a cathode connected to variable-potential terminal 52.

A 30,000 volt D. C. voltage supply is connected between the two constant-potential terminals 47 and 51, as shown, with a polarity such that terminal 47 is maintained 30,000 volts negative with respect to terminal 51. Terminal 51 is connected to circuit ground, and thereby is maintained at circuit ground potential. Consequently, terminal 47 is maintained at a constant potential of −30,000 volts relative to circuit ground by voltage supply 58. A capacitor 59 is connected between pulse output terminal 53 and constant-potential terminal 51, or circuit ground, which amounts to the same thing. A resistor 60 is connected in parallel with capacitor 59, as shown.

In this circuit, the base potential of output terminal 53, between output pulses, is equal to circuit ground potential. Since trigger pulses are supplied to pulse generator 44 first, and to pulse generator 42 afterwards, a negative-going potential change is produced at variable-potential terminal 52 before a positive-going potential change is produced at terminal 48. As operation of pulse generator 44 drives terminal 52 more negative, rectifier 57 conducts current and charges capacitor 59 to a high negative voltage. Accordingly, the potential of output terminal 53 quickly drops, in about 1 microsecond or less, to −30,000 volts or less, depending upon the output of the pulse generator. At −30,000 volts, rectifiers 54 and 56 become conductive and prevent appreciable further negative-going changes in the potential of terminal 53, and thus limit the maximum amplitude of the output pulses.

Some time later, depending on the design or adjustment of delay circuit 43, pulse generator 42 is triggered in operation and the potential of terminal 48 is driven in a positive-going direction. As this happens, rectifier 56 conducts current and quickly discharges capacitor 59. Output terminal 53 is prevented from becoming appreciably more positive than circuit ground by the conduction of current through rectifiers 55 and 57.

In the foregoing manner, the Fig. 3 circuit provides negative-going rectangular-waveform pulses of up to approximately 30,000 volts amplitude. Except for the change in polarity caused by reversing the sequence in which the two blocking oscillators are triggered into operation, and the change in location of the D. C. power supply, the circuit illustrated in Fig. 3 may be designed and operated in precisely the same manner as the circuits illustrated in Figs. 1 and 2.

It should be understood that this invention in its broader aspects is not limited to specific examples herein illustrated and described. The following claims are intended to cover all changes and modifications within the true spirit and scope of the invention.

What is claimed is:

1. A high-voltage, rectangular-waveform pulse generator comprising the following combination: a pulse output terminal; first and second pulse transformers each having a primary and a secondary, each of said secondaries having a constant-potential terminal and a variable-potential terminal; a half-wave rectifier having an anode connected to said variable-potential terminal of said first transformer and having a cathode connected to said output terminal; another half-wave rectifier having an anode connected to said output terminal and having a cathode connected to said variable-potential terminal of said second transformer; D. C. voltage supply means connected between said two constant-potential terminals for maintaining said constant-potential terminals at different fixed electric potentials, with said constant-potential terminal of said first transformer negative with respect to said constant-potential terminal of said second transformer; means providing a shunt capacitance that opposes changes in the electric potential of said output terminal; and means for supplying current pulses to said two primaries sequentially, respective ones of said current pulses inducing a positive-going change in the potential of said variable-potential terminal of said first transformer and a negative-going change in the potential of said variable-potential terminal of said second transformer; whereby said shunt capacitance is alternately charged and discharged to produce rectangular-waveform voltage pulses at said output terminal.

2. A high-voltage, rectangular-waveform pulse generator comprising the following combination: a pulse-output terminal; two pulse transformers each having a primary and a secondary; first and second half-wave rectifiers connected across respective ones of said two secondaries, each of said first and second rectifiers having an anode and a cathode; a third half-wave rectifier having an anode connected to the cathode of said first rectifier and having a cathode connected to said output terminal; a fourth half-wave rectifier having an anode connected to said output terminal and having a cathode connected to the anode of said second rectifier; D. C. voltage supply means connected for maintaining the anode of said first rectifier at a fixed negative potential relative to the cathode of said second rectifier; a capacitor connected between said output terminal and said voltage supply means; and means for supplying current pulses to said two primaries alternately; whereby said capacitor is alternately charged and discharged to produce rectangular-waveform voltage pulses.

3. A high-voltage, rectangular-waveform pulse generator comprising the following combination: a pulse output terminal; first and second pulse transformers each having a primary and a secondary, each of said secondaries having a constant-potential terminal and a variable-potential terminal; a half-wave rectifier having an anode connected to said variable-potential terminal of said first transformer and having a cathode connected to said output terminal; another half-wave rectifier having an anode connected to said output terminal and having a cathode connected to said variable-potential terminal of said second transformer; D. C. voltage supply means connected between said two constant-potential terminals for maintaining said constant-potential terminals at different fixed electric potentials, with said constant-potential terminal of said first transformer negative with respect to said constant-potential terminal of said second transformer; a capacitor connected between said output terminal and one of said constant-potential terminals, said capacitor providing a shunt capacitance that opposes changes in the electric potential of said output terminal; two pulse generators operable to supply current pulses to respective ones of said primaries; a trigger generator connected to supply repetitive trigger pulses to one of said pulse generators, each such trigger pulse initiating an operation of said one pulse generator for supplying a current pulse to one of said primaries; a delay circuit connected to transmit delayed trigger pulses from said trigger generator to the other of said pulse generators, each such delayed trigger pulse initiating an operation of said other pulse generator for supplying a current pulse to the other of said primaries; whereby current pulses are supplied to said two primaries sequentially, said pulses inducing a positive-going change in the potential of said variable-potental terminal of said first transformer and a negative-going change in the potential of said variable-potential terminal of said second transformer, alternately, said capacitor charging and discharging alternately through said two rectifiers responsive to said two potential changes, thereby producing rectangular-waveform voltage pulses at said output terminal.

No references cited.